United States Patent [19]

Dalle et al.

[11] 4,159,595
[45] Jul. 3, 1979

[54] INSTALLATION FOR CULTIVATING PLANTS

[75] Inventors: Jean L. Dalle, Manduel; Maurice Dumont, Grenoble; André Fourcy, Biviers; Aimé Freychet, Grenoble; André Gouzy, St. Nazaire-les-Eymes, all of France

[73] Assignee: Commissariat a l'Energie Atomique, Paris, France

[21] Appl. No.: 732,090

[22] Filed: Oct. 13, 1976

Related U.S. Application Data

[63] Continuation of Ser. No. 539,106, Jan. 7, 1975,

[51] Int. Cl.² .................................... A01G 13/00
[52] U.S. Cl. .................................... 47/2; 47/9; 47/19; 165/45; 165/107 D; 237/1 R; 237/13
[58] Field of Search .................. 47/1, 42, 2, 9, 18, 47/19, 32, 33, 48.5, 58, 17; 138/28, 37, 119, 156, 178, DIG. 11, B2; 239/450; 137/171; 165/45, 107, DIG. 22; 66/12, 13; 237/1, 13, 81; 203/DIG. 18

[56] References Cited

U.S. PATENT DOCUMENTS

| 806,901 | 12/1905 | Mendenhall | 61/12 |
|---|---|---|---|
| 1,260,914 | 3/1918 | Kline | 47/58 |
| 1,374,416 | 4/1921 | Wilde | 61/13 |
| 3,166,458 | 1/1965 | Chinn et al. | 47/9 X |
| 3,205,619 | 9/1965 | Henry | 47/9 |
| 3,206,892 | 9/1965 | Telkes et al. | 47/9 |
| 3,362,106 | 1/1968 | Goldring | 47/59 |
| 3,470,943 | 10/1969 | Van Huisen | 47/2 |
| 3,727,345 | 4/1973 | Smith | 47/2 |
| 3,833,013 | 9/1974 | Leonard | 137/171 |
| 3,863,710 | 2/1975 | Masters | 47/2 |
| 3,989,572 | 11/1976 | Swartz | 61/12 |
| 3,993,122 | 11/1976 | Svenstam | 165/45 |

FOREIGN PATENT DOCUMENTS

| 91350 | 7/1961 | Denmark | 47/48.5 |
|---|---|---|---|
| 585727 | 9/1933 | Fed. Rep. of Germany | 47/48.5 |
| 290648 | 6/1965 | Netherlands | 47/32 |

*Primary Examiner*—Edgar S. Burr
*Assistant Examiner*—James R. Feyrer
*Attorney, Agent, or Firm*—Lane, Aitken & Ziems

[57] ABSTRACT

An installation for cultivating plants on a soil, characterized in that it comprises at least one heat-exchanger, each of said exchangers being constituted by an elongated flat flexible hose with a then wall resting on the soil, and feed means for circulating liquid of a preselected regulated temperature through each of said hoses.

12 Claims, 10 Drawing Figures

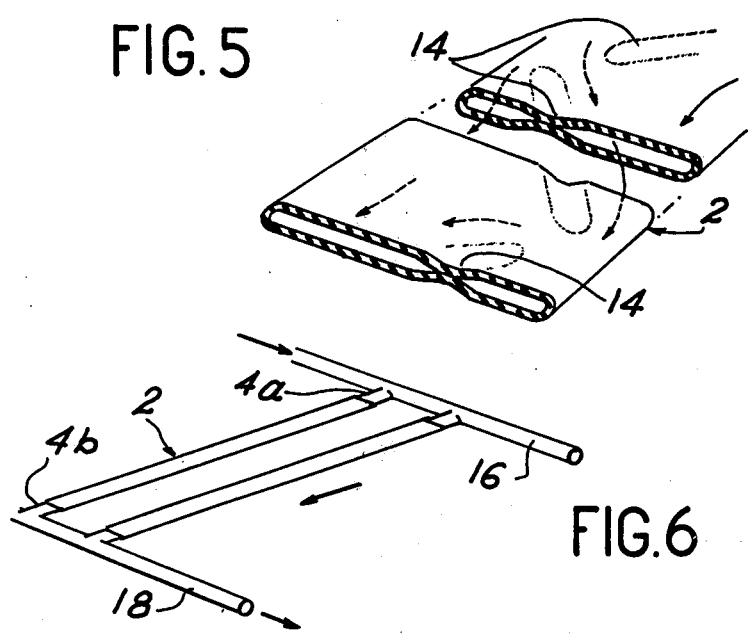
FIG. 5
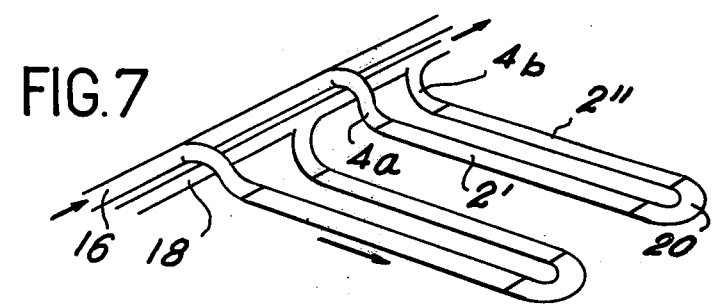
FIG. 6
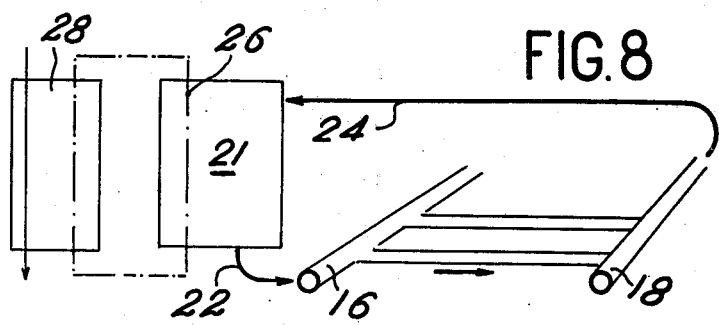
FIG. 7
FIG. 8

INSTALLATION FOR CULTIVATING PLANTS

This is a continuation, of application Ser. No. 539,106 filed Jan. 7, 1975 now abandoned.

The present invention relates to an installation for cultivating plants on a soil.

More specifically, the invention relates to an installation adapted to heat (or, contingently cool) the soil in order to promote the plant cultivation to be carried out therein. To that end, water at relatively low temperature is caused to flow in tubes, or hoses, resting on the soil.

Up to this day when sunlight does not provide sufficient heat, the heating operation has been carried out either by means of pulsed hot air, or through radiation of means of very hot water flowing in small diameter overhead conduits. Alternatively, conduction, by means of very hot water flowing in small diameter conduits sunk in the ground, has also been used. In the latter case, the high thermal inertia does not permit easy adjustment to meet abrupt climatic changes.

The invention directly relates to an installation for cultivating plants which can operate with water at a relatively low temperature flowing in hoses, which is more easily handled and less costly than the operations mentioned above.

The present installation for cultivating plants on a soil is characterized in that it comprises at least one heat-exchanger, each of said exchangers being constituted by an elongated flat flexible hose with a thin wall resting on the soil, and feed-means for circulating liquid of a preselected regulated temperature through each of said hoses.

According to an embodiment, the installation is characterized in that the liquid provided by said feed-means is water at an average temperature of less than 45° C.

Preferably, that water has a static head of less than 10 cm of water.

According to a possible embodiment, said feed-means are constituted by a heat-pump adapted to deliver water at a temperature of from 25° to 45° C. achieved by means of calories withdrawn from water at a temperature of from 4° to 25° C. feeding the evaporation associated to said pump.

The heat-pump evaporator can be fed either with water expelled by an industrial plant or with the water from a ground water reservoir.

Alternatively the installation can be fed directly with hot water expelled by an industrial plant.

According to another embodiment, said hoses are connected, at one end to a first manifold which, is connected to the feed-means, and at the other end to a second manifold which is connected to a return line.

According to a another embodiment, the hoses are pin-shaped and said two manifolds are located side-by-side.

The invention is also concerned with applying the installation to cultivation with mulching.

The invention also relates to applying the installation to the conditioning of green-houses where the invention can include means for interrupting the flow of hot water in the hoses as soon as the green-houses have reached a sufficient temperature, and means for circulating cool water in said hoses in order to cool the green-house temperature during sunny periods.

The invention will be more clearly understood from the following description given hereunder of various embodiments, with reference to the accompanying drawing, in which:

FIG. 5 is a perspective view, partially in cross-section of a mattress-like hose;

FIGS. 6 and 7 are perspective views showing the feeding of the hoses by means of manifolds;

FIG. 8 is the diagram of another embodiment of the feed-means;

Figure 1:
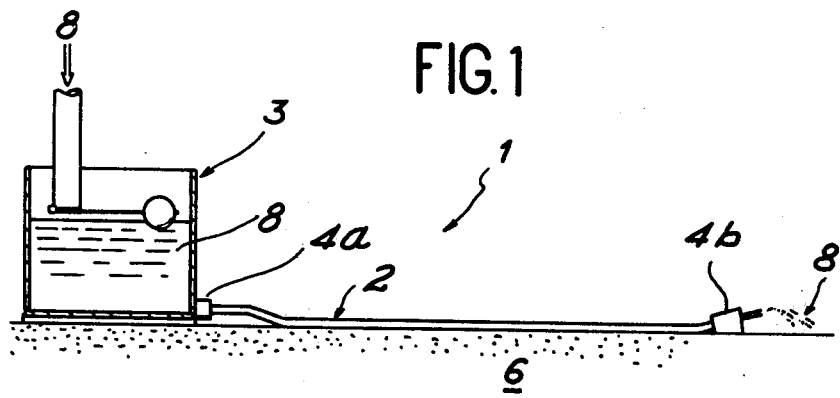
FIG. 1 is a side view, partially in section, of the exchanger according to the invention.

In FIG. 1, exchanger 1 comprises a hose 2 connected at its upstream end to a constant level feed-tank 3 by means of an adapter 4a. The hose is terminated at its downstream and by an adapter 4b with loss of head. Along hose 2 circulates a hot-fluid 8.

Figure 2:
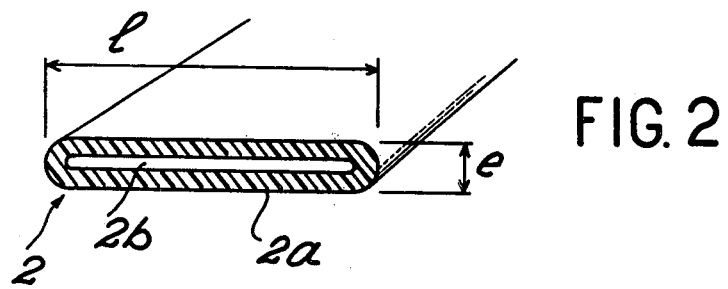
FIG. 2 is a cross-section of the exchanger hose.

Hose 2 (FIG. 2) is flat, its width l being much greater than its thickness e. The thin walls 2a define an inner passage 2b, the cross-section of which is flat, too.

Hose 2 can be made of a large diameter rubber or plastic tube collapsing under its own weight once placed on the ground 6. Preferably, the hose is made of opaque material. Thus is avoided the formation of microorganisms on the hose inner wall.

The tube provides only one passage 2b and, in spite of its wall being thin, it can be trampled or punctured without being severely damaged; a puncture therein will simply generate a slight seeping, not detrimental to the exchanger flow-rate.

In view of the low pressure of the hot-fluid film flowing in the hose, the passage 2b of the latter maintains its flat shape.

Figure 3:
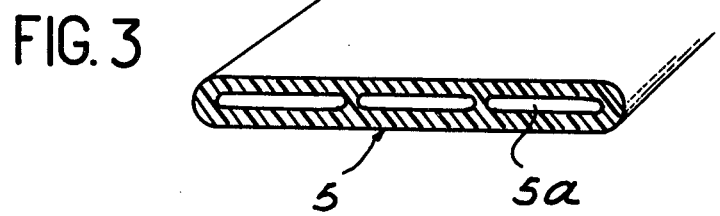
FIG. 3 is a variant of FIG. 2.

With a view to increasing the exchanger area without making it vulnerable to possible shocks, the invention provides the use of a flexible hose 5, with longitudinal partitions (FIG. 3) so as to form parallel conduits 5a of very small diameter.

The upstream adapter 4a permits to connect hose 2 to tank 3, whereas downstream adapter 4b is so designed as to raise the hot-fluid jet 8 above the ground level.

Figure 4:
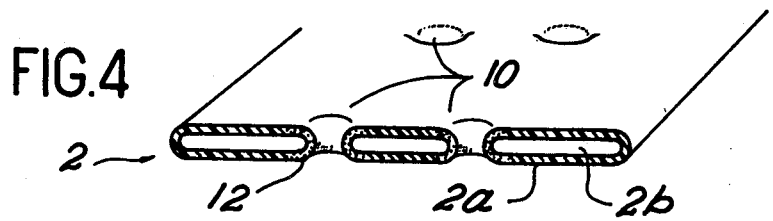
FIG. 4 shows another variant, adapted to permit mulching and planting out.

For cultivation with mulching (hoses of black plastics), it is possible to provide hoses ensuring both mulching and the flow of water. To that end (FIG. 4), holes, or ports, so made through the opposed walls 2a of hose 2 are connected by means of circular welds 12 maintaining inner passage 2b tight. Ports 10 are evenly distributed over the whole surface of hose 2, thus allowing the planting out of seedlings through the latter. For such an application, the various hoses should cover at least 50% of the ground surface. Similar holes (not shown) with welded edges can be applied to partitioned hose 5.

In order to facilitate the manufacture of the mulching-hoses, viz, the hoses with holes made through their walls and connected edge-to-edge by means of welds, it is possible to form said holes as simple cut-outs substantially converging to the center of the weld.

A method for manufacturing such mulching-hoses consists in making the edge-to-edge welds of the opposed walls of the hoses and of the cut-outs simultaneously by applying against the hose at least one tool comprising a heated crown, the inside of which is provided with knives.

The exchanger according to the invention operates with low temperature differentials, viz, at an average fluid temperature lower than 45° C. While the most convenient hot fluid to be used is, of course, water, there would be however no objection to use another fluid, e.g., oil, provided it may be recovered.

Should the hot fluid used be water, a 10 cm head in the tank and a proper adjustment of the loss-of-head of downstream adapter 4b would be sufficient for providing an even flow of film B.

A good thermal efficiency of the exchanger is achieved in view of the large area of the contact surface between the hose and the ground, and the hose flat shape makes it more easily wound on a winding-drum and permits to store it more conveniently.

FIG. 5 shows another embodiment of hoses 2 consisting in mattress-like hoses, viz, hoses the opposite walls of which are connected at a plurality of places along their lengths. Such connection between the two walls can be in the form of dots, circles, rectilinear segments, either aligned, or staggered or in herring-bone pattern. Such an arrangement provides many advantages:

it renders the hose more stable by preventing it from coiling and, thus, damaging crops;

it reduces the thickness of the hose in operation, while maintaining the same flow-rate;

it permits to increase the pressure which, therefore, can be higher than 10 cm of water, since the hoses cannot swell and become cylindrical to the point of rolling on the ground. Such a pressure increase permits to use hoses of greater lengths;

it induces turbulent movements promoting the transfer of heat;

it ensures a fair mixture of water streams and, therefore, evenly distributes the temperature of water across the hose.

FIG. 5 shows a hose made mattress-like by means of rectilinear segments 14 arranged in herring-bone pattern.

In the hose water-feed such as shown in FIG. 1, the coolant liquid is not recovered, which is a nuisance if the liquid used is relatively expensive. Such an arrangement is also a nuisance should the liquid used be water and the installation according to the invention erected in a barren area.

FIGS. 6 and 7 show two embodiments adapted to re-cycle the liquid after it has flowed in the hoses.

According to the embodiment of FIG. 6, the hoses 2 are mounted in parallel between an upstream manifold 16 (feed) and a downstream manifold 18 (recycling). Each adapter 4a is connected to manifold 16, and each adapter 4b to manifold 18. These manifolds are advantageously rigid conduits. Manifold 16 is connected to the hot-water feed-source. Manifold 18 permits to re-cycle water (or any other liquid) once it has flowed in hoses 2, while ensuring the loss-of-head. In this instance, the nature of the hot water source will be explained later on.

Instead of being rectilinear, the hoses can have the shape of hair-pins, as shown in FIG. 7. Such a shape can also be obtaned, as in FIG. 7, by associating two half-hoses 2', 2", these two half-hoses being connected at one end thereof by a bent conduit 20.

Adapter 4a of half-hose 2' is connected to manifold 16 and adapter 4b of half-hose 2" is connected to manifold 18, these two manifold being mounted side by side.

If the installation according to the invention is located in a green-house with but one access-door, the installation can clear that door without having to disconnect the adapters. To clear the ground, one has merely to coil the hoses.

FIG. 8 illustrates a specially interesting feed-mode for the installation according to he invention by using a heat-pump.

The fluid is heated by means of a heat-pump feeding the first manifold at a temperature of from 25° to 45° C., by using the calories withdrawn from water at a temperature of from 4° to 25° C. serving to feed the evaporator of said pump.

The method permits to resort to every natural and industrial means, so as to optimize the heat-pump efficiency.

Thus, the pump evaporator can be fed either with water extracted from a phreatic sheet, or with tepid water expelled by an industrial plant.

In FIG. 8 is shown diagrammatically a heat-pump 21, the outlet of which is connected to manifold 16 through conduit 22, while its inlet is connected to manifold 18 through conduit 24.

Evaporator 26 of the heat-pump is fed by a source of water (block 28) at a temperature of from 4° to 25° C., e.g., a ground water reservoir.

In the spring and in the summer, the heat-exchanger can also be used, in certain hot countries, for air-conditioning. Indeed, in such hot countries, plants have to be protected against too much heat and it is therefore necessary to lower the temperature of their environment so as to allow their growth. On the other hand, in such hot countries, very hot days are followed by cool nights, and such temperature changes are detrimental to an economical exploitation.

Figure 10:
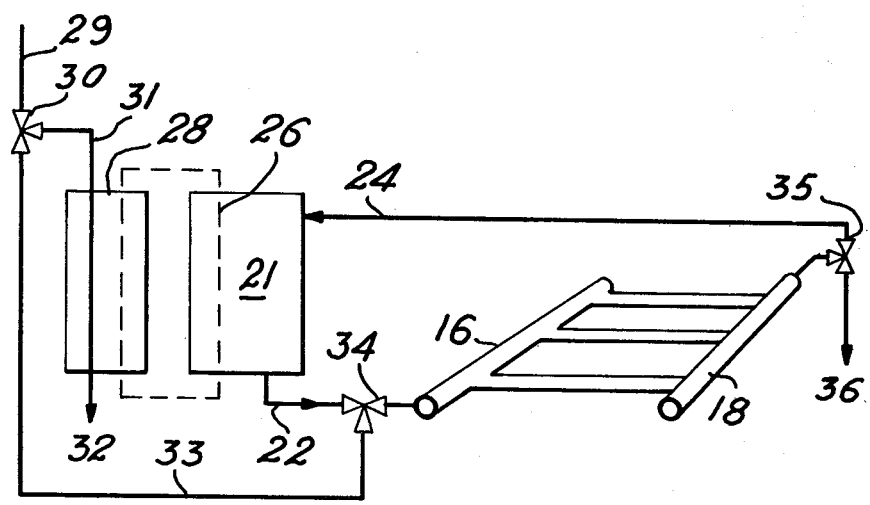
FIG. 10 shows means for circulating cold as well as hot fluids in the hoses.

According to a modified embodiment, the installation according to the invention are heated in the night and cooled in the day-time, means being provided for circulating in the hoses cold fluid in the day-time and hot fluid in the night. This is what is shown in FIG. 10.

For heating, evaporator 28 of heat-pump 26 is fed from the water-source of phreatic sheet 29, through three-way valve 30 and conduit 31. Three-way valve 31 permits to feed manifold 16 by means of heated-water conduit 22. Three-way valve 35 permits tepid water from manifold 18 to return to the condenser of heat-pump 21, through conduit 24.

For cooling purposes, the three valves 30, 34 and 35 are set to their other position. Manifold 16 is fed with cool water from conduit 29 via conduit 33. Manifold 18 is vented to the outside (36) through valve 35.

Abrupt temperature changes can also occur in the same day. The thermal inertia of the green-houses is relatively low, which results in abrupt temperature decreases and increases within a relatively short time. The invention permits to render temperature as even as possible in green-houses.

Water is known as having a high thermal inertia so that it is therefore possible, merely by causing water to flow in the hoses, to maintain plants in the green-houses at substantially constant temperatures. Should the thus-obtained inertia prove insufficient, water (e.g., a pool) might be kept in store for increasing it.

When the installation according to the invention is fed directly with hot industrial waters, without intermediate heat-pumps, a possible embodiment of the invention consists in providing a pressurized heat-exchanger between the hot industrial waters and the fluid flowing in the hoses. Such an embodiment separates the two fluids efficiently and prevents any penetration of industrial waters into the green-house heating fluid.

In view of the small temperature difference between the fluid flowing in the hoses and the ground on which they are laid, these hoses should cover a reltively important portion of the ground. According to a preferred solution, at least half the ground area is covered by the hoses.

In some cases, a partial de-gassing of the water flowing in the hoses was observed. This leads to the formation of gas-bubbles hitting against the hose upper wall.

While thermal exchanges between water and the soil are not modified, however exchanges between water and air are altered, which is a real nuisance when hoses are used, e.g., for heating a green-house.

Figure 9:
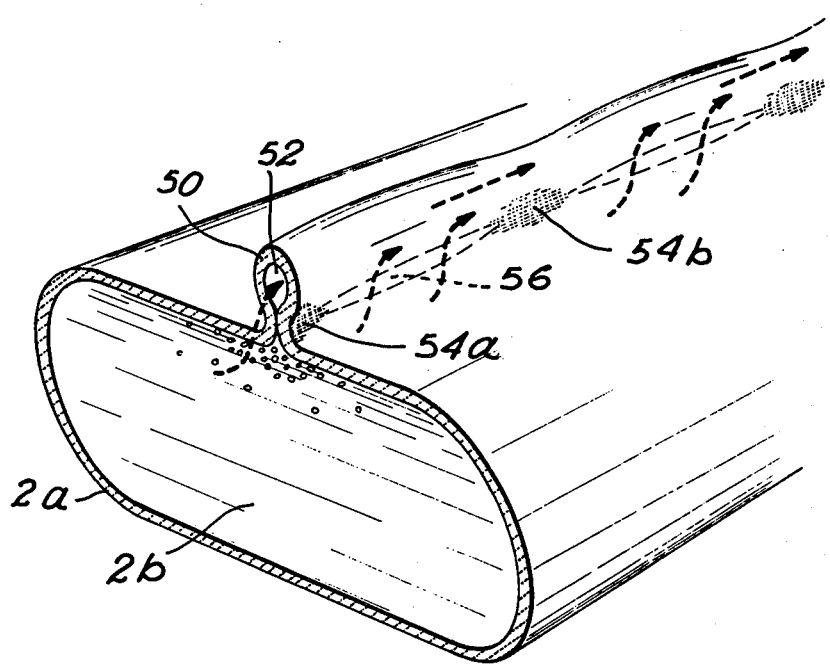
FIG. 9 is a sectional view of another embodiment of the hoses.

As a remedy to that drawback, the hoses can be given the shape shown in FIG. 9. The upper portion of thin wall 2a is modified so as to form a bead, or flange, 50 defining a conduit 52 for the passage of gases, said conduit being parallel with passage 2b; bead 50 is obtained, e.g., by means of weld-points such as 54a, 54b.

The gas-bubbles formed gather in conduit 52 after having passed through gaps 56 between successive weld-points.

What we claim is:

1. An installation for regulating the temperature of soil for cultivating plants, comprising:
   (a) a plurality of elongated hoses arranged in parallel and placed on the surface of the soil;
   (b) each hose being formed of a non-self-supporting thin wall material defining an inner passage which can carry liquid therethrough so that when the hose is filled with liquid the hose will expand and lay flat with its width greater than its height and effectively regulate the temperature of the soil by transmitting the liquid temperature through the thin wall to the soil;
   (c) means for preventing the hose from rolling and creating turbulence when liquid is circulated through the hose including said thin wall material forming upper and lower wall portions which are connected to each other at a plurality of places spaced apart along the length of said hose;
   (d) circulation means for circulating said liquid from one end to the other through each of said hoses at a preselected regulated temperature in an amount sufficient to occupy substantially the entire inner passage of each hose; and
   (e) temperature regulation means for regulating the temperature of said liquid.

2. The installation of claim 1, wherein the plurality of places which connect the upper and lower wall portions are arranged in a herring-bone pattern.

3. The installation of claim 1, further comprising:
   (a) an input adapter at the input end of each hose and an output adapter at the output end of said hose to create a loss of head in liquid flowing through the hose; and
   (b) feed means for feeding the hose at its input end liquid at a preselected regulated temperature in an amount sufficient to occupy substantially the entire inner passage of the hose.

4. An installation according to claim 1, wherein said hoses are connected at one end to a first manifold connected to said circulation means and at the other end to a second manifold.

5. An installation according to claim 4, wherein said hoses are arranged in the form of U-shaped hair-pins and both said manifolds are mounted side-by-side.

6. The installation of claim 1, wherein each said hose includes openings along its length extending through the height of the hose and exposing a surface of the soil for placement of plants therein, said openings being located at the plurality of places where the upper and lower wall portions are connected to each other, said openings being isolated from the inner passage of said hose by means of contact points which provide a watertight connection between the upper and lower wall portions formed by said thin wall material.

7. The installation of claim 6, wherein said contact points for said openings are edge-to-edge welds joining the upper and lower wall portions to form a circular welded edge and wherein the opening for placement of said plant is formed within said circular welded edge.

8. An installation for regulating the termperature of soil for cultivating plants, comprising:
   (a) a plurality of elongated hoses arranged in parallel and placed on the surface of the soil;
   (b) each hose formed of a non-self-supporting thin wall material defining an inner passage which can carry liquid therethrough so that when the hose is filled with liquid the hose will expand and lay flat with its width greater than its height and effectively regulate the temperature of the soil by transmitting the liquid temperature through the thin wall to the soil;
   (c) said thin wall material also forming an upper wall portion comprising a hollow bead which defines a conduit parallel to, and separated from, but communicating with the remainder of the base for removing gas bubbles formed in the base, by means of a plurality of contact points spaced apart along the length of said hose;
   (d) circulation means for circulating said liquid from one end to the other through each of said hoses at a preselected regulated temperature in an amount sufficient to occupy substantially the entire inner passage of each hose; and
   (e) temperature regulation means for regulating the temperature of said liquid.

9. The installation of claim 8, wherein the contact points are evenly distributed along the length of the hose.

10. The installation of claim 1, wherein said hoses are connected at one end to a first manifold connected to said circulation means and at the other end to a second manifold.

11. The installation of claim 10, wherein said hoses are arranged in the form of U-shaped hair-pins and both said manifolds are mounted side-by-side.

12. The installation of claim 8, further comprising:
   (a) an input adapter at the input end of each hose and an output adapter at the output end of said hose adapted to create a loss of head in liquid flowing through the hose; and
   (b) feed means for feeding the hose at its input end liquid at a preselected regulated temperature in an amount sufficient to occupy substantially the entire inner passage of the hose.

* * * * *